(12) United States Patent
Greenwald et al.

(10) Patent No.: US 9,908,799 B2
(45) Date of Patent: Mar. 6, 2018

(54) METHOD FOR IMPROVING QUALITY OF AQUACULTURE POND WATER

(71) Applicant: NCH Corporation, Irving, TX (US)

(72) Inventors: Charles J. Greenwald, Dallas, TX (US); Haibo Cao, Flower Mound, TX (US); Christopher Zetena, Dallas, TX (US); Jordan E. Church, Lewisville, TX (US); Kelly Gillespie, Richardson, TX (US)

(73) Assignee: NCH CORPORATION, Irving, TX (US)

( * ) Notice: Subject to any disclaimer, the term of this patent is extended or adjusted under 35 U.S.C. 154(b) by 72 days.

(21) Appl. No.: 14/720,088

(22) Filed: May 22, 2015

(65) Prior Publication Data

US 2015/0336828 A1    Nov. 26, 2015

Related U.S. Application Data

(60) Provisional application No. 62/002,476, filed on May 23, 2014.

(51) Int. Cl.
*C02F 3/34*    (2006.01)
*C02F 3/10*    (2006.01)
(Continued)

(52) U.S. Cl.
CPC ............... *C02F 3/34* (2013.01); *C02F 3/105* (2013.01); *C02F 3/109* (2013.01); *C02F 3/303* (2013.01);
(Continued)

(58) Field of Classification Search
None
See application file for complete search history.

(56) References Cited

U.S. PATENT DOCUMENTS 4,840,792 A     6/1989   Joulain et al.
4,872,985 A  * 10/1989   Dinges .................. A01G 31/00
                                                          210/602
(Continued)

FOREIGN PATENT DOCUMENTS

EP         0885557       8/2004
WO      WO2000033854     6/2000
(Continued)

OTHER PUBLICATIONS

BIO-AMP ("Bio-Amp Biological System". Product Specifications [online] ECOBionics. [retrieved on Nov. 16, 2016]. Retrieved from the Internet: <URL: http://www.labequip.com/stock/pictures/34030.pdf>).*

(Continued)

*Primary Examiner* — Krishnan S Menon
*Assistant Examiner* — Ryan B Huang
(74) *Attorney, Agent, or Firm* — Ross Barnes LLP; Robin L. Barnes; Monty L. Ross

(57) ABSTRACT

A method for treating and improving the quality of pond water used in growing aquatic species for aquacultural applications by adding to the pond water active bacteria that are preferably grown on site in combination with a nitrification enhancement agent such as calcium carbonate or calcified seaweed, and an optional reaction surface area modifier such as calcified seaweed or plastic or metal particles or fragments.

18 Claims, 2 Drawing Sheets

(51) Int. Cl.
*C02F 3/30* (2006.01)
*C02F 101/16* (2006.01)
*C02F 101/30* (2006.01)
*C02F 103/20* (2006.01)

(52) U.S. Cl.
CPC .............. *C02F 3/348* (2013.01); *C02F 3/308* (2013.01); *C02F 2101/16* (2013.01); *C02F 2101/30* (2013.01); *C02F 2103/20* (2013.01); *C02F 2203/00* (2013.01); *C02F 2203/004* (2013.01); *C02F 2209/07* (2013.01); *Y02W 10/15* (2015.05)

(56) References Cited

U.S. PATENT DOCUMENTS

| | | | |
|---|---|---|---|
| 4,910,024 | A | 3/1990 | Pratt |
| 4,919,936 | A | 4/1990 | Iwanami et al. |
| 4,995,980 | A * | 2/1991 | Jaubert ............... A01K 63/042 210/150 |
| 4,999,193 | A | 3/1991 | Nguyen |
| 5,093,121 | A | 3/1992 | Kvanta et al. |
| 5,154,594 | A | 10/1992 | Gamlen |
| 5,292,523 | A | 3/1994 | Kono et al. |
| 5,320,256 | A | 6/1994 | Wood |
| 5,501,857 | A | 3/1996 | Zimmer |
| 5,702,604 | A * | 12/1997 | Yamasaki ............... B01D 53/18 210/151 |
| 5,821,112 | A | 10/1998 | Botto et al. |
| 5,968,569 | A | 10/1999 | Cavadini et al. |
| 6,254,910 | B1 | 7/2001 | Paluch |
| 6,308,658 | B1 | 10/2001 | Steckel |
| 6,312,746 | B2 | 11/2001 | Paluch |
| 6,335,191 | B1 * | 1/2002 | Kiplinger ............... C12M 23/02 210/600 |
| 6,382,132 | B1 | 5/2002 | Steckel et al. |
| 6,461,607 | B1 | 10/2002 | Farmer |
| 6,723,076 | B1 | 4/2004 | Strobel |
| 6,827,957 | B2 | 12/2004 | Paluch et al. |
| 6,849,256 | B1 | 2/2005 | Farmer |
| 7,081,361 | B2 | 7/2006 | Pearce, III et al. |
| 7,485,466 | B2 | 2/2009 | Jenkins et al. |
| 7,635,587 | B2 | 12/2009 | Pearce, III et al. |
| 7,670,845 | B2 | 3/2010 | Wenzel et al. |
| 7,713,726 | B2 | 5/2010 | Farmer |
| 7,754,469 | B2 | 7/2010 | Baltzley et al. |
| 8,025,847 | B2 | 9/2011 | Fouarge et al. |
| 8,025,874 | B2 | 9/2011 | Bellot et al. |
| 8,062,902 | B2 | 11/2011 | Mestrallet |
| 8,093,040 | B2 | 1/2012 | Pearce, III et al. |
| 8,192,733 | B2 | 6/2012 | Cobb et al. |
| 8,277,799 | B2 | 10/2012 | Farmer |
| 8,404,227 | B2 | 3/2013 | Bellot et al. |
| 8,506,951 | B2 | 8/2013 | Rehberger et al. |
| 8,540,981 | B1 | 9/2013 | Wehnes et al. |
| 8,551,762 | B2 | 10/2013 | Fleming et al. |
| 8,647,690 | B2 | 2/2014 | Corrigan |
| 2003/0165472 | A1 | 9/2003 | McGrath et al. |
| 2006/0275324 | A1* | 12/2006 | Elston ..................... C12R 1/01 424/234.1 |
| 2008/0107699 | A1 | 5/2008 | Spigelman et al. |
| 2009/0111694 | A1 | 4/2009 | Dituro |
| 2012/0052152 | A1 | 3/2012 | Armentrout |
| 2012/0100094 | A1 | 4/2012 | Reuter et al. |
| 2013/0017174 | A1 | 1/2013 | Hargis et al. |
| 2013/0092087 | A1 | 4/2013 | Bachman et al. |
| 2014/0220662 | A1 | 8/2014 | Hashman |
| 2015/0118203 | A1 | 4/2015 | Boyette et al. |

FOREIGN PATENT DOCUMENTS

| | | | |
|---|---|---|---|
| WO | WO2002051264 | 7/2002 | |
| WO | WO2006002495 | 1/2006 | |
| WO | WO2008071930 | 6/2008 | |
| WO | WO2009040445 | 4/2009 | |
| WO | WO2009117790 | 10/2009 | |
| WO | WO2009126473 | 10/2009 | |
| WO | WO2010003255 | 1/2010 | |
| WO | WO 2010003255 A1 * | 1/2010 | .............. A01G 9/14 |
| WO | WO2010020639 | 2/2010 | |
| WO | WO2010066012 | 6/2010 | |
| WO | WO2010079104 | 7/2010 | |
| WO | WO2010088744 | 8/2010 | |
| WO | WO2010142004 | 12/2010 | |
| WO | WO 2010142004 A2 * | 12/2010 | .............. A01K 63/04 |
| WO | WO2012027214 | 3/2012 | |
| WO | WO2012108830 | 8/2012 | |
| WO | WO2012167882 | 12/2012 | |
| WO | WO2014083177 | 6/2014 | |

OTHER PUBLICATIONS

Use of probiotics in aquaculture, EPA Position Paper, 2012.
Chorawala, M. R., P. M. Oza, G. B. Shah. Probiotics, Prebiotics and Synbiatics: A Health Benefit Supplement. Published Jul.-Sep. 2011 by the Research Journal of Pharmaceutical, Biological and Chemical Sciences vol. 2, Issue 3, pp. 1101-1111.
Sekhon, B. S. and J. Saloni. Prebiotics, probiotics and synbiotics: an overview. Published Dec. 2010 by the Journal of Pharmaceutical Education and Research. vol. 1, Issue No. 2, pp. 13-36.
Patterson, J.A., K. M. Burkholder. Application of prebiotics and probiotics in poultry production. Published in Jan. 2003 by Poultry Science 82:627-631.
ADM Animal Nutrition—Direct Fed Microbial Application and Usage, product information available from AMD Animal Nutrition, a division of Archer Daniels Midland Company, believed to be published prior to 2014; obtained from the Internet on Dec. 28, 2016 at <http://www.admani.com/Animal%20HealthiTech%20Bulletins/Animal%20Direct%20fed%20microbial.htm>.
Casula, G and S. Cutting. Bacillus Probiotics: Spore Germination in the Gastrointestinal Tract. Published May 2002 by the American Society for Microbiology in Applied and Environmental Microbiology vol. 68, No. 5: 2344-2352.
Amerah, A.M., C. J. van Rensburg, P. W. Plumstead, C. Kromm, and S. Dunham. Effect of feeding diets containing a probiotic or antibiotic on broiler performance, intestinal mucosa-associated avian pathogenic *E. coli* and litter water-soluble phosphorus. Published in Jan. 2013 in the Journal of Applied Animal Nutrition, vol. 1, e7, pp. 1-7.
Sutton, A.L. et al., Potential for Reduction of Odorous Compounds in Swine Manure Through Diet Modification, Published in 1999 by the American Society of Animal Science in the Journal Anim. Sci. 1999, 77:430-439.
Davis M.E. et al. Effect of a Bacillus-based direct-fed microbial feed supplement on growth performance and pen cleaning characteristics of growing-finishing pigs, Published in 2008 y the American Society of Animal Sciences in the Journal of Anim. Sci. 2008, 86:1459-1467.
BioGrow & Provita Gameguard, product information available from Provita Eurotech Limited, 21 Bankmore Road, Omagh, County Tyrone, Northern Ireland, believed to be published at least as early as 2013 (BioGrow product available since 2001).
BioGrow, product information available from Provita Eurotech Limited, believed to be published at least as early as 2013 (BioGrow product available since 2001), retrieved from the Internet an Feb. 16, 2015 at <http://www.provita.co.uk/poultry/biogrow>.
Swine Bluelite 2Bw a water soluble acidified electrolyte product with probiotics for pigs, product information available from TechMix Global, published Sep. 2011, retrieved from the Internet on Feb. 15, 2016 at <https://www.techmixglobal.com/swine-bluelite-2bw>.
Calsporin Poultry FAQ, product information available from Quality Technology International, Inc., published 2012, retrieved from the Internet on Feb. 15, 2016 at <http://www.qtitechnology.com/sites/default/files/pdfs/CalsporinPoultryFAQ. pdf>.
Calsporin Swine FAQ, product information available from Quality Technology International, Inc., published 2012, retrieved from the

(56) References Cited

OTHER PUBLICATIONS internet on Feb. 15, 2016 at <http://www.qtitechnology.com/sites/default/files/pdfs/CalsporinSwineFAQ.pdf>.

Calsporin, product information available from Calpis Co., Ltd. 4-1 Ebisu-Minami 2-chome Shibuya, Tokyo, Japan, believed to be published at least as early as 2013 (product available since at least 2000).

European Food Safety Authority Scientific Opinion on the Safety and Efficacy of BioPlus2B, published in the EFSA Journal 2011; 9(9):2356, retrieved from the Internet on Feb. 15, 2016 at <http://www.efsa.europa.eu/sites/default/files/scientific_output/files/main_documents/2356.pdf>.

FloraMax B-11 Proven in the Lab . . . confirmed in the field, product information available from Pacific Vet Group, elieved to be published at least as early as 2011 (product available in 2004), Retrieved from the Internet on Feb. 16, 2015 at http://www.pacificvetgroup.com/docs/PVG-FloraMaxB-11.pdf>.

Floramax B11 (Tech Sheet) product information available from Ivesco, believed to be published at least as early as 2011 (product available since 2004), Retrieved from the Internet on Feb. 16, 2015 at <http://www.ivescopoultry.com/Attachment/5/20535_5_FloraMaxTechSheet.pdf>.

Scientific opinion on the safety and efficacy of Bactocell (*Pediococcus acidilactici*) as a feed additive for use in water for drinking for weaned piglets, pigs for fattening, laying hens and chickens for fattening, published by the European Food Safety Authority in 2012 in the EFSA Journal 2012: 10(7):2776.

Fortify Liquid Concentrated Direct-Fed Microbial for Drinking Water product label information published by Assist Natural Product, Lena, Illinois, product believed to be available since 2013, retrieved from the internet on Feb. 16, 2015 at <http://www.assist-nps.com/files/Fortify%20Liquid%20Label.pdf>.

Bactocell® Drink is now authorized in Europe as a feed additive for swine and poultry, news release published by Lallemand Animal Nutrition on May 15, 2013, retrieved from the Internet on Feb. 16, 2015 at <http://lallemandanimalnutrition.com/news/bactocell-drink-is-now-authorized-in-europe-as-a-feed-additive-for-swine-and-poultry/>.

Bactocell on tracks for EU Authorization as Additive for Drinking Water, news release published by Lallemand Animal Nutrition on Aug. 29, 2012, retrieved from the internet on Feb. 16, 2015 at <http://lallemandanimalnutrition.com/news/bactocell-drink-on-tracks-for-eu-authorization-as-a-feed-additive-for-use-in-drinking-water-for-swine-and-poultry/>.

Biotic for Shrimp—product information available from Biopharmachemie, believed to be published at least as early as 2011, Retrieved from the internet on Feb. 16, 2015 at <http://biopharmachemie.com/product/products-for-shrimp/biotic-for-shrimp.html>.

Biozyme for Shrimp—product information available from Biopharmachemie, believed to be published at least as early as 2011, Retrieved from the internet on Feb. 16, 2015 at <http://biopharmachemie.com/product/products-for-shrimp/biozyme-for-shrimp.html>.

Delivering superior swine performance—product information on VevoVitall available from DSM, believed to be published at least as early as 2011, ; retrieved from the Internet on Feb. 15, 2016 at <http://www.dsm.com/markets/anh/en_US/products/products-eubiotics/products-eubiotics-vevovitall.html>.

Poultry Product Quality—product information regarding BioPlus available from Chr. Hansen, believed to be published at least as early as 2011, retrieved from the Internet on Feb. 15, 2016 at http://www.chr-hansen.com/animal-probiotics-and-silage-inoculants/probiotics-for-poultry/poultry-product-quality>.

Biotic for Poultry and Swine—product information available from Biopharmachernie, believed to be published at least as early as 2011, Retrieved from the internet on Feb. 16, 2015 at <http://www.biopharmachemie.com/product/products-for-livestock/biotic.html>.

Proflora, Live DFM: Bacillus subtilis Strain QST 713,product information available from Zoetis, 100 Campus Drive, Florham Park, New Jersey 07932, believed to be published at least as early as 2013.

Proflora Live DFM: Bacillus subtilis Strain Qst 713,product information available from Zoetis, believed to be published at least as early as 2013, Retrieved from the internet on Feb. 16, 2015 at <https://www.zoetisus.com/products/poultry/proflora.aspx>.

\* cited by examiner

METHOD FOR IMPROVING QUALITY OF AQUACULTURE POND WATER

CROSS-REFERENCE TO RELATED APPLICATION

This application claims the benefit under 35 U.S.C. § 119(e) of U.S. Provisional Application Ser. No. 62/002,476 filed on May 23, 2014.

BACKGROUND OF THE INVENTION

1. Field of the Invention

This invention relates to the treatment of aquaculture pond water to reduce organic waste, ammonia, and disease pressure in a water livestock application.

2. Description of Related Art

Aquaculture refers to the raising of aquatic species that are used as a human or animal food source. The technique applies some types of control to the natural environment of the raised species to improve overall harvests. This can include the artificial hatching of species to increase the commercial harvest of animals in the wild, hatching and raising of the species in enclosed ponds, and the hatching and raising of species in tidally drained enclosed areas adjacent to the shoreline. Problems associated with this process include: pollution that is discharged from the raising facility and will deteriorate the water quality around; loss of product due to deteriorated water quality in the raising facility; and increased disease pressures associated with pathogenic microorganisms in the raising facility. Such problems may be identified through testing or monitoring a variety of parameters, including pH, conductivity, ammonia, nitrate, phosphate and alkalinity. Conductivity is an indicator of salt content, amounts greater than 1200 ppm is no longer considered fresh water; an ideal amount is 700 ppm and range of 300-1200 ppm. Ammonia levels measure the amount of available oxygen for fish. High levels of ammonia block oxygen transfer in fish from gills to the blood; however it is also a product of their metabolic waste. While ammonia from fish waste is often not concentrated enough to be toxic itself, fish farmers must closely monitor ammonia levels due to the high concentration of fish per pond. Oxygen is consumed by nitrifying bacteria in the pond which break down the toxic ammonia to a non-toxic form; however, this massive use of oxygen reduces the oxygen available for uptake by fish. Ammonia levels >1 ppm are considered toxic for fish life. Additionally, nitrate levels are examined to determine the amount of plant fertilizer in the water. Nitrate is highly leachable from the surrounding soil and can be harmful to small children and pregnant women. Nitrate becomes nitrite in the GI tract and interacts with the blood's ability to carry oxygen. Max contamination level for nitrate is 10 ppm. Alkalinity is the measure of a pond's or lake's ability to neutralize acid without a change in pH. Alkalinity will decrease over time due to bacteria; however an ideal level is 100 ppm with acceptable range of 50-200 ppm. Phosphate found in ponds and lakes is largely from human and animal waste. Fertilizer run-off is a major source of phosphate found in golf course and decorative ponds. Elevated levels cause an increased rate of eutrophication which in turn increases sludge production. Moderation levels of phosphate can stimulate plant growth causing an increase in algae production; levels of >0.1 ppm is an indication of accelerated plant growth and is considered outside acceptable levels.

Current technologies to address these problems include bioremediation, antibiotics, and chemical additives. Typical bioremediation technologies include the application of supplemental bacteria to the water to enhance the microbiological activities to improve the water quality. It is also known to use nitrifiers to enhance the nitrification process to convert the toxic ammonia into non-toxic nitrate. Chemical additives are added to improve the water quality and aid the microbiological activities by providing extra nutrients and alkalinity. Antibiotics are added to inhibit the growth of the pathogenic microorganisms. Problems associated with the current technologies include high cost and poor water quality improvement performance with the inactive supplemental bacteria, low nitrification activities due to the existence of organic waste and lack of nitrifier growing sites, bioaccumulation of antibiotics in the raised aquatic species.

SUMMARY OF THE INVENTION

The method of the invention provides a cost-effective approach to delivering active bacteria to pond water (or a growing pond) in an aquaculture facility to degrade the organic waste and inhibit the growth of pathogenic microorganisms without bioaccumulation. The method of the invention reduces disease pressure in the water livestock, resulting in improved harvests of the species raised in the aquaculture operation. The addition of a nitrification enhancement agent as disclosed here as part of the method provides a steady alkalinity source and extra growing sites for the nitrifier to promote the nitrification activity and ammonia reduction.

The method of the invention desirably includes the delivery of active bacteria, optionally including a probiotic bacteria, most preferably generated from an on-site biogenerator using solid bacteria starter material, into an aquaculture application. Such biogenerators and their methods of use are disclosed, for example, in U.S. Pat. Nos. 6,335,191; 7,081,361; 7,635,587; 8,093,040; and 8,551,762, the contents of which are incorporated by reference into this disclosure to facilitate practice of the invention. Additionally, a probiotic composition and delivery system as disclosed in U.S. application Ser. No. 14/524,858 filed on Oct. 27, 2014, which is incorporated herein by reference, is a preferred probiotic composition and delivery system for that composition, but other probiotics and delivery systems may be used.

The active, vegetative bacteria discharged from the biogenerator can be supplied directly to growing ponds or can be accumulated and diluted with pond water or another similarly suitable diluent, such as water from a municipal water system, prior to discharging it into growing ponds. Dilution may aid in delivery of the treatment solution flowing from the biogenerator to the growing pond, if the biogenerator is located some distance from the growing pond. The active bacteria will degrade the organic waste and inhibit the growth of the pathogenic microorganisms in the water in the aquaculture facilities, without requiring the addition of (or reducing the amount of) chemical treatments and antibiotics used in the growing pond. The invention also desirably includes contemporaneous application of at least one nitrification enhancement agent to the growing ponds. Nitrification enhancement agents increase the activity of nitrifying bacteria naturally found in the water to decrease the ammonia level. These nitrification agents comprise alkalinity enhancement agents that increasing the alkalinity of the water, which is necessary for nitrification (7 parts alkalinity to 1 part ammonia) and/or surface area modifying agents to add surfaces for nitrifying bacteria to grow, since nitrifying bacteria grow as biofilms and need surfaces to which they can attach. The alkalinity enhancement agents can include, for example, calcium carbonate, calcified seaweed or other similarly effective additives. These agents can be added at a higher-than-dissolution amount to provide a continuing source of alkalinity as they slowly dissolve. Certain nitrification agents, such as calcified seaweed, seaweed acts as both an alkalinity enhancement agent and a surface area modifying agent by providing both alkalinity and high surface area, providing a support surface for biofilms of nitrifiers to grow. Calcified seaweed also acts as a source of micronutrients for the bacteria. Other nitrification enhancement agents only act as surface area modifying agents, such as plastic or metal pieces, or other similarly effective materials to increase the surface area over which favorable reactions and interactions can occur. One or more agents that act only as surface area modifiers (and not alkalinity enhancers) may also be added to the growing pond, either alone or preferably in combination with one or more alkalinity enhancement agents; however, an agent that acts only as a surface area enhancer would not degrade in the growing pond and would not be added with each batch of bacteria solution. Such agents that act only as surface area modifiers would preferably only be added to a growing pond once. Agents that act as alkalinity enhancement agents would be added to the growing pond contemporaneously with a batch of bacteria on a periodic basis, such as seasonally (once per season or once every summer, twice per year, etc.) or as needed. As used herein, the term "contemporaneous" is intended to mean "at or about" the time that a batch of vegetative bacteria and other components or agents are added to the growing pond or other growing medium in which aquatic species are grown at an aquaculture facility.

BRIEF DESCRIPTION OF THE DRAWINGS

Graphs showing the results of a laboratory study are shown in the following figures.

DESCRIPTION OF THE PREFERRED EMBODIMENTS

Figure 1:
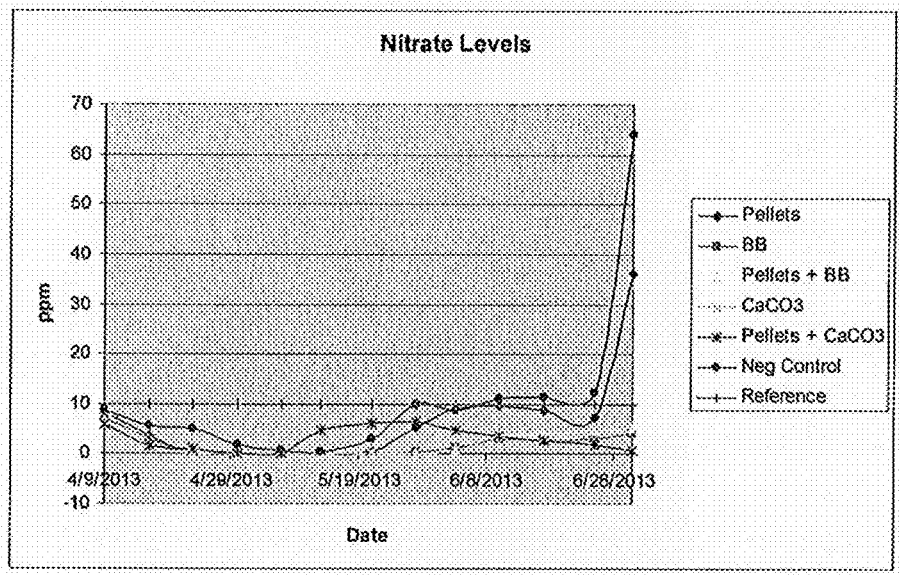
FIG. 1 is a graph of nitrate levels.
Figure 2:
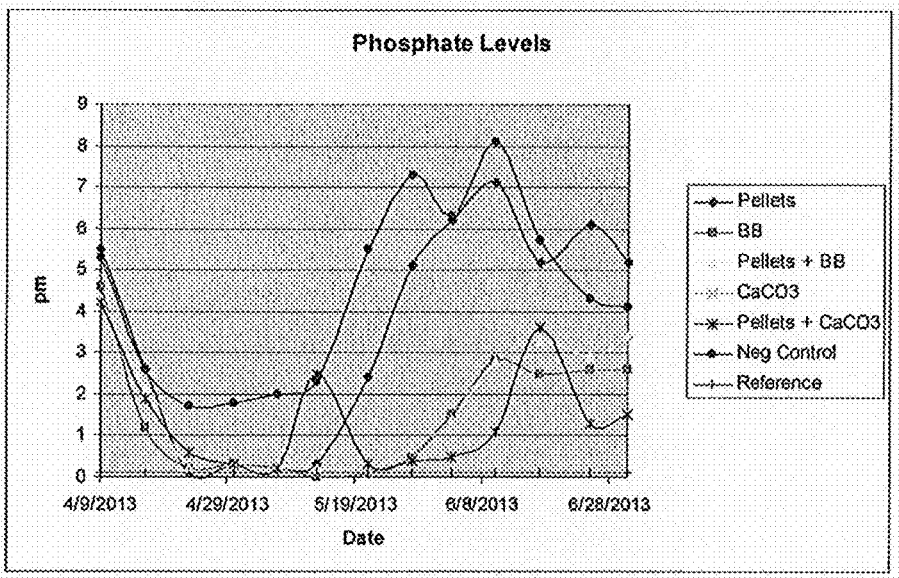
FIG. 2 is a graph of ortho-phosphate levels.
Figure 3:
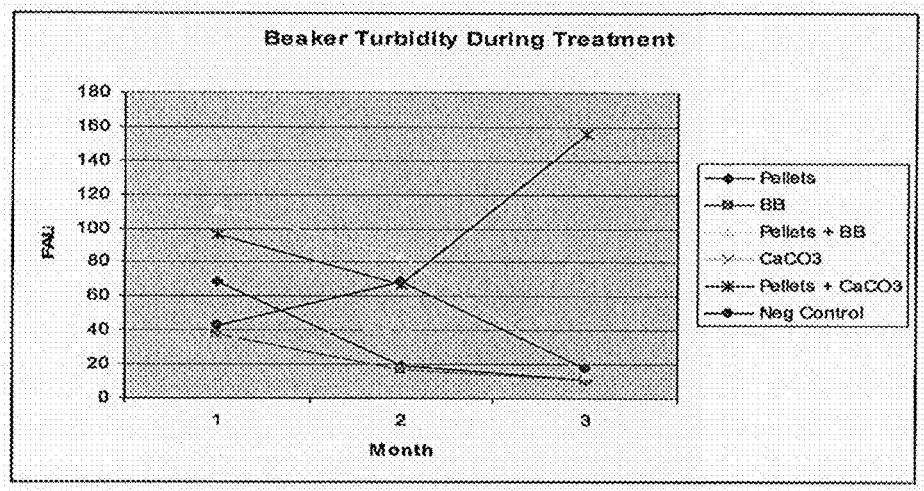
FIG. 3 is a graph of turbidity.

The genera of bacteria suitable for use in the method of the invention are believed to include any one or more species in the genera *Bacillus, Bacteroides, Bifidobacterium, Lueconostoc, Pediococcus, Enterococcus, Lactobacillus, Megasphaera, Pseudomonas* and *Propionibacterium*. Probiotic bacteria that may be generated on-site include any one or more of the following: *Bacillus amylophilus, Bacillus licheniformis, Bacillus pumilus, Bacillus subtilis, Bacteroides ruminocola, Bacteroides ruminocola, Bacterioides suis, Bifidobacterium adolescentis, Bifidobacterium animalis, Bifidobacterium bifidum, Bifidobacterium infantis, Bifidobacterium longum, Bifidobacterium thermophilum, Enterococcus cremoris, Enterococcus diacetylactis, Enterococcus faecium, Enterococcus intermedius, Enterococcus lactis, Enterococcus thermophiles, Lactobacillus brevis, Lactobacillus buchneri, Lactobacillus bulgaricus, Lactobacillus casei, Lactobacillus cellobiosus, Lactobacillus curvatus, Lactobacillus delbruekii, Lactobacillus farciminis, Lactobacillus fermentum, Lactobacillus helveticus, Lactobacillus lactis, Lactobacillus plantarum, Lactobacillus reuteri, Leuconostoc mesenteroides, Megasphaera elsden-*
*nii, Pediococcus acidilacticii, Pediococcus cerevisiae, Pediococcus pentosaceus, Propionibacterium acidipropionici, Propionibacterium freudenreichii,* and *Propionibacterium shermanii.*

A satisfactory bacteria growing and delivery device for use in the method of the invention will include an on-site biogenerator as referenced above or any other similarly effective source for the bacteria. Most preferably, the on-site biogenerator uses solid bacteria starter material to generate a bacteria solution to be discharged into the growing pond, with the solution preferably having around $1\times10^9$-$1\times10^{10}$ cfu/mL of vegetative bacteria species. Multiple biogenerators may be provided to provide larger quantities of bacteria to the growing pond, to provide different species of bacteria to the growing pond or at different times or rates, or to space out the discharge of bacteria solution around the perimeter of the growing pond to aid in dispersing the bacteria through the pond. A pump or other mixing device may also be added to the growing pond (if not already in place) to aid in dispersing the bacteria solution (and nitrification enhancers or surface area enhancers) throughout the growing pond. The on-site biogenerator is preferably configured to contain a quantity of bacterial starter material in solid or liquid form and mixed with nutrients so that multiple batches of bacteria solution can be discharged at periodic intervals over a prolonged period of time before the starter material needs to be replenished. For example, the biogenerator may hold around 37 grams of starter material containing $1\times10^8$ cfu/g to discharge a bacteria solution containing around $1\times10^{10}$ cfu/mL once every 24 hours for 60 days. Nutrients and water are added in the biogenerator, along with the starter material, to grow a batch of bacteria solution to be periodically discharged to the growing pond. Most preferably, a source of sterile or treated water (such as potable water from a municipal water supply) is used to provide water to the biogenerator. On-site water sources, such as the growing pond, could also be used, but the bacteria already present in that water (and even low levels of bacteria in water from a municipal water supply) may compete with the bacteria in the starter material while growing in the biogenerator, resulting in a lower cfu/ml batch of the beneficial bacteria and a proliferation of harmful bacteria. A preferred starter material is FREE-FLOW Pellets or FREE-FLOW Liquid and BioAmp nutrient commercially available from EcoBionics and FlexFill respectively, but other starter materials may also be used, depending on the desired bacteria species.

A bacteria solution is preferably discharged from the biogenerator or biogenerators once every 12 to 36 hours, and most preferably around once every 24 hours to the growing pond over the course of a treatment cycle. Most preferably, around 3000 mL of bacteria solution containing around $1\times10^{10}$ cfu/mL dosed around once every 24 hours will be sufficient treat a growing pond containing 100,000 gallons of water. Other volumes of bacteria solution and dosing intervals may be used to treat growing ponds of differing sizes as will be understood by those of ordinary skill in the art. A treatment cycle is preferably continuous with the biogenerator running throughout the year (other than periodic shut-downs for maintenance or replenishment of bacteria starter and nutrients). Other dosing intervals and quantities of bacteria solution may be used depending on the conditions in the pond, aquatic species involved, temperature of the growing pond, and other factors as will be understood by those of ordinary skill in the art.

The bacteria generated on-site in the biogenerator may include one or more probiotic bacteria. In addition to bacteria generated on-site in the biogenerator, a probiotic solution comprising any known probiotic bacteria (such as *Bacillus licheniformis, Bacillus pumilus*, or *Bacillus subtilis*), a surfactant suitable for ingestion by animals and aquatic species (such as Polysorbate 80), a preservative (such as sorbic acid potassium sorbate, sodium sorbate, calcium sorbate, sodium benzoate, or enzoic acid), and a thickener (such as guar gum or xanthan gum), in water (most preferably sterile water) may be added to the growing pond. Such probiotic compositions, and delivery methods for those compositions, are disclosed in U.S. application Ser. No. 14/524,858 filed on Oct. 27, 2014, which is incorporated herein by reference.

With at least one dose (or batch) of bacteria solution discharged to the growing pond, one or more nitrification enhancement agents are preferably added contemporaneously. Alkalinity enhancing agents, including calcium carbonate or calcified seaweed, may be added periodically, such as seasonally or as needed to reduce phosphates, and not with each dose of bacteria. The agents can be added at a higher-than-dissolution amount to provide a continuing source of alkalinity as they slowly dissolve. Slowly dissolving alkalinity enhancing agents, such as calcified seaweed, also act as a surface area modifier, providing a support surface for biofilms of nitrifying bacteria to grow and they also aid in nutrient delivery. Additionally, agents that act only as surface area modifiers (such as pieces of metal or plastic) may be added to the growing pond as needed to reduce nitrogen or phosphorous, along with a batch or dose of bacteria solution and one or more alkalinity enhancing agents, but there are preferably added only once and not with each dose of bacteria solution. These surface enhancement agents similarly provide a support surface for biofilms of the added bacteria to grow, which aids in faster development of the beneficial bacteria. Most preferably, around 100 pounds of such nitrification enhancement agents are added per 7.5 million gallons of growing pond, and this amount may be scaled for other growing pond volumes. Preferred dispersal methods for the nitrification enhancement agents can include the use of automated devices or manual application to the water in the growing ponds. Automated or manually operated devices useful for broadcasting or otherwise dispersing at least one nitrification enhancement agent in the form of prills, pellets or granules are commercially available and are well known to those of skill in the art. Additionally, these nitrification enhancing agents may be dispersed through a pond using the self-dispersing additive system and method, which employs effervescent materials along with the treatment agent in water soluble packaging, described in U.S. patent application Ser. No. 14/689,790 filed on Apr. 17, 2015, which is incorporated herein by reference.

Suitable applications for the method of the invention include, for example and without limitation various types of aquaculture application such as hatcheries, ponds, and tidal flow aquaculture. The combined use of vegetative bacteria, preferably grown on-site, and at least one nitrification enhancement aid such as calcium carbonate, calcified seaweed or another material that is similarly effective for cost-effective treatment of water used in aquaculture applications to address organic waste, ammonia, and pathogenic microorganism as well as general water quality issues. The effectiveness of the subject method for achieving these objectives is believed to be further enhanced by the addition of calcified seaweed, or other plastic or metal pieces, particles or fragments that increase the available surface area upon which interactions or reactions can occur.

A laboratory study was conducted to evaluate the benefits of adding beneficial bacteria and nitrification enhancement agents to pond water. One goal of the study was to evaluate the efficacy of added bacteria (pond blend commercially available from EcoBionics) as inhibitory or herbicidal against algae production. This study employed the use of six 2 L beakers, each filled with 1.5 L of source water taken from an established fish tank with algae present. Each beaker also contained one gold fish from source tank, air stone, light source that alternated 12 hours on then 12 hours off, and watch glass cover to reduce loss to evaporation. A pond blend bacteria solution was generated in a BIO-Amp™ biogenerator using 37 g of Pond Plus pellets After a 24 hour growth cycle in the biogenerator, an aliquot of bacteria solution was obtained and diluted to maintain a ratio of 3 L of pond blend:579024 gallons pond water, however, a preferred ratio to be employed in the field is 3 L of pond blend:100,000 gallons of pond water. Based on this ratio, around 0.4 µL of pond blend bacteria solution was added to specific of the beakers having 1.5 L of fish tank water. Calcified seaweed, was added to specific beakers according to manufacturer's instructions based on rates for clarification; this equated to 0.045 g of calcified seaweed per 1.5 L of water. An equal amount of calcium carbonate was added to some of the beakers. The additives in each beaker were as follows:

TABLE 1

| Beaker 1 | 0.4 µL of pond blend and 1.5 L of source water only |
| Beaker 2 | 0.045 g of calcified seaweed and 1.5 L of source water only |
| Beaker 3 | 0.4 µL of pond blend, 0.045 g of calcified seaweed, and 1.5 L of source water |
| Beaker 4 | 0.045 g of calcium carbonate and 1.5 L of source water only |
| Beaker 5 | 0.4 µL of pond blend, 0.045 g of calcium carbonate, and 1.5 L of source water |
| Beaker 6 | served as the negative control and contained only 1.5 L of source water |

Each test beaker was treated according to one preferred dosing schedule that would be utilized in the field. Beakers 1, 3 and 5 with pond blend would be treated (dosed) once per week with an additional 0.4 µL of pond blend. Depending on growing pond conditions, other dosing schedules may be used in the field. Calcified seaweed and calcium carbonate were added only once at the beginning of this study, however, additional dosing may be used in the field.

One pre-treatment sample (before the addition of pond blend bacteria solution, calcified seaweed or calcium carbonate) was taken from each beaker and analyzed to obtain a baseline for comparison to the post treatment results. Chemical analysis was performed once per week using 200-300 mL samples from each beaker. These weekly measurements included analysis of pH, conductivity, nitrate, ortho phosphate, total alkalinity and ammonia levels. Once per month turbidity was examined and photographs were taken to assess changes in algal growth and overall clarity. Treatment and analysis of the beakers was continued for a total of three months; again to mirror the length of the field study.

Data analysis was performed using Excel 2003, using a two sampled two-tailed t-test comparing pre-treatment vs. post-treatment numbers at 95% confidence level. The two sample two-tailed t-test tested the null hypothesis of no difference in the means of pre and post-treatment with an alternative hypothesis of there is a difference in the means.

$H_O$=µ pre-treatment=µ post-treatment $H_A$=µ pre-treatment≠µ post-treatment

Baseline readings indicated elevated phosphate levels in all beakers, over 40 times the level indicative of accelerated algal growth. All other measurements were within acceptable ranges.

TABLE 2

Results from Two Sample T-Test for Nitrate and Phosphate

| Beaker | Nitrate p-value | % Reduction Nitrate | Phosphate p-value | % Reduction phosphate |
| --- | --- | --- | --- | --- |
| 1 (pond blend only) | 0.88 | 20 | 0.47 | 38 |
| 2 (Calcified Seaweed only) | 0.01* | 79 | 0.02* | 73 |
| 3 (pond blend + calcified seaweed) | 0.04* | 76 | 0.07 | 66 |
| 4 (Calcium carbonate only) | 0.03* | 77 | 0.05 | 66 |
| 5 (pond lend + calcium carbonate) | 0.24 | 52 | 0.02* | 72 |
| 6 (control) | 0.90 | 25 increase | 0.68 | 19 |

*Indicates a significant result

The test beaker containing only the bacterial blend pellets showed no statistically significant change over the three month study period. Phosphate levels dropped after two weeks but within one month returned to pre-treatment levels. Nitrate levels mirrored those of phosphate. Of all the test beakers, only beaker 1 had nitrate and phosphate levels rise similar to the negative control. This indicates a minimal effect on major chemical indicators of pond health when using bacteria alone.

The two beakers containing calcified seaweed showed statistically significant changes in pre vs. post-treatment means. There was a significant drop in nitrate levels of 79% and 76% with p-values 0.01 and 0.04 in beaker 2 and 3 respectively. Phosphate levels also dropped significantly in beaker 2 by 74% with a p-value of 0.02. The beaker containing calcified seaweed and pellets showed a phosphate reduction of 66%, however, this value was not significant (see Table 2). It is important to note that this lack of statistical significance may be subject to this study's low sample size limitation. This study did not test for changes in pathogenic bacteria in the samples, but the addition of the pond blend bacteria solution would be expected to reduce those numbers through competition. Additionally, it is believed that the addition of a bacteria solution from a biogenerator to an actual growing pond according to a preferred embodiment of the invention would achieve better results than in the laboratory study because the bacteria in the bacteria solution can act synergistically with the nitrifying bacteria already present in the growing pond and the added bacteria in the bacteria solution can aid in consuming waste in the water to reduce ammonia levels. Similar to the calcified seaweed beakers, the two beakers that contained calcium carbonate showed a significant difference in pre versus post treatment means. In beaker 4, the nitrate levels dropped 77% with a p-value of 0.03. While, beaker 5 which contained calcium carbonate and bacterial pellets showed a significant decrease in phosphate levels of 72%, p-value 0.02 (see Table 2). Calcium carbonate may be a suitable substitute for calcified seaweed in aquaculture treatment. Beakers with calcified seaweed or calcium carbonate out performed those without. Beaker 5, which contained bacterial blend pellets and calcium carbonate, had a significantly lower post-treatment mean of phosphate levels and the least effect on pH. However, beaker 2 and 5 had statistically significant drops in phosphate levels.

Turbidity examined throughout this study showed a continual decrease in all the test beakers. When comparing pre-treatment pictures to post, there is an increase in the presence of algae in all beakers, however, by the second month there was evidence of algal death in two beakers. Beaker 4 containing calcium carbonate and Beaker 6 (control) both appeared yellow in color indicating a dying algal system. Algal death is a common problem experienced after an initial algal bloom, as oxygen in the water is depleted; despite the presence of the air stone. As the algae died, there was a marked increase in nitrate levels. This was evident by the increase in nitrate levels above pre-treatment in this month, increasing 14% and 38% in beaker 4 and 6 respectively. By the final month, nitrate levels in Beaker 4 recovered and decreased though the system still had a dark green, yellow color. Nitrate continued to increase to 6× the contamination level in Beaker 6.

A field study focusing on improving general pond health and clarity while reducing sludge was also conducted on various ponds. Although this study was not aquaculture specific (as the ponds in the study were ornamental or recreational and not for raising and harvesting aquatic species), it provides some useful information on the addition of bacteria and nitrification enhancing agents. The study included five ponds in and around Irving, Tex.; the ponds, identified as Ponds 1-5 ranged from 23,400 $ft^3$ to 720,131 $ft^3$. The length of this study was seven months. One to two times per week, a surface water sample of 200-300 mL was taken bank side from each pond. These samples were analyzed for pH, alkalinity, nitrate, phosphate, ammonia, conductivity, turbidity and $E.$ $coli$ spp. concentrations. Phosphate, ammonia and turbidity analysis was performed using a Hach DR890 colorimeter. $E.$ $coli$ spp. determination was performed using specialized media for coliform growth (3M Petrifilm 6404) incubated at 35° C. for 48 hours.

Once per month each pond was sampled for sludge depth, clarity and dissolved oxygen (DO). These measurements were taken from a small boat at two to four locations, marked by GPS coordinates to obtain representative sampling. Sludge depth was measured in inches using a sludge judge; each GPS location was sampled three to four times with the average taken. Dissolved oxygen was measured in ppm from the bottom layer and again at 18" from the surface using a Hach LDO probe with a Hach HQ30d meter. Clarity was determined in %/feet using a Secchi Disk, which gave an empirical measurement. Additionally, once per month photographs were taken at each pond at two to four locations, again marked by GPS coordinates, to give a patron point-of-view of overall surface conditions.

A BioAMP™ 750 climate controlled biogenerator was installed at each location for daily on-site dosing of a specialized pond blend of bacteria. *Bacillus* spp. spores were pelletized using a modified FREE-FLOW™ formula; pellets were fed into the growth vessel where they grew in optimal conditions for 24 hours and were then dispersed directly into the pond. Maintenance of the BioAMP 750 had to be modified from standard protocol as sodium hypochlorite (bleach) is considered toxic to surface water and not allowed by the City of Irving for use. To obtain a similar whitening effect as the standard bleach treatment, 155 g of sodium bicarbonate (baking soda) was used to remove excess biofilm and clean the growth vessels. In addition to monthly maintenance, the biogenerators were monitored for any malfunctions and ability to maintain programmed temperature despite an ambient temperatures exceeding 100° F.

As a companion to the bacterial treatment, calcified seaweed was also applied to each pond. The amount of calcified seaweed given was dependent on volume at a ratio of 100 lbs to 1,000,000 ft³ of water. The calcified seaweed was dosed using water soluble packages containing an effervescent couple and the calcified seaweed as described in U.S. patent application Ser. No. 14/689,790.

Each study pond was given the same amount of bacteria daily (30 trillion CFUs). A correlation matrix revealed that sludge depth was inversely related to dose-rate. Two of the smaller ponds had the greatest observed reduction in sludge levels and clarity, as well as, the highest daily dose of bacteria at $2\times10^7$ CFU/L and $7\times10^6$ CFU/L respectively. Clarity as observed, show positive effects on all ponds, regardless of size. Clarity was approximately 100% in the three smallest ponds of this study. Conversely the two largest ponds only achieved clarity of 20% by the end of this study.

A one-sided 2 sample t-test was used to evaluate if sludge levels significantly decreased after treatment. A p-value of 0.006 found a statistically significant average decrease of 31%. $H_O$: μ pre-treatment=μ post-treatment, $H_A$: μ pre-treatment>μ post-treatment. This average reduction observed equates to an average 3 inch reduction of the sludge layer. Additionally, every pond in this study experienced a decrease in sludge level when compared to pre-treatment (see Table 3).

TABLE 3

Changes in PO₄, NO₃ & Sludge by Pond

| Pond | %Δ PO4 | %Δ NO3 | %Δ Sludge |
| --- | --- | --- | --- |
| 1 | −19 | −71 | −45 |
| 2 | −77 | −100 | −18 |
| 3 | −40 | 0 | −16 |
| 4 | −70 | −100 | −37 |
| 5 | −48 | 0 | −43 |
| Average | −52 | −91 | −31 |

The average observed change in *E. coli* spp. was a reduction of 59%. It is important to note the full range included an increase of 145% to a decrease of 100%. Such a wide range coupled with a small sample size made it difficult to determine the effectiveness of the treatment on *E. coli* spp. concentration. Three out of the five study ponds experienced an increase in *E. coli* spp. concentrations; however, the other two ponds saw a dramatic decrease; however the increase is believed to be the result of rainwater runoff into the ponds.

The overall effect of this treatment on phosphate concentrations was examined, comparing pre-treatment to post-treatment levels. The data was found to be non-parametric and a one-sided Mann-Whitney test was employed to determine if phosphate concentrations significantly decreased after treatment. $H_O$: μ pre-treatment=μ post-treatment, $H_A$: μ pre-treatment>μ post-treatment. A p-value of 0.0000 was obtained indicating that the overall 52% decrease in phosphate levels after treatment was statistically significant. Detailed examinations of changes in phosphate level by pond also revealed meaningful decreases. Each treated pond saw a decrease in phosphate concentrations ranging from 19% to 77% (see Table 3). The average of 52% reduction was similar to the 57% reduction observed in phase I of this study. This indicates that the increase in frequency of bacterial dosing may not be associated with the decrease in phosphate concentrations. Furthermore, a marked decrease in phosphate levels was observed directly following an application of calcified seaweed. The first dose was administered in spring with the second given in summer after phosphate levels began to rise in June. The non-chemical, eco-friendly nature of the powdered product offers promising results for control of phosphate concentrations.

Similarly, nitrate levels were examined using a one-sided Mann-Whitney test to evaluate if nitrate concentrations significantly decreased after treatment. $H_O$: μ pre-treatment=μ post-treatment, $H_A$: μ pre-treatment>μ post-treatment. With a p-value of 0.0000 it was determined that the 91% reduction in concentration was statistically significant (see Table 3). To that end, baseline nitrate concentrations were below recommended levels so no reductions were anticipated let alone a statistically significant reduction of 91%. Furthermore, each study pond that had detectable nitrate was significantly reduced to below detection limits of 0.01 ppm by month 4. This was a vast improvement over the reduction observed in Phase I (~69%) and indicates that the increased frequency of bacterial dosing had a direct effect on these concentrations. Overall this study demonstrated that enhanced treatment with bacteria and calcified seaweed increased pond health as measured by chemical proxies and a decrease in sludge level.

Those of ordinary skill in the art will also appreciate upon reading this specification, that modifications and alterations to the probiotic compositions and methodology and system for delivery of probiotic compositions may be made within the scope of the invention and it is intended that the scope of the invention disclosed herein be limited only by the broadest interpretation of the appended claims to which the inventors are legally entitled.

What is claimed is:

1. A method for treating water in a growing pond used in an aquaculture application, the method comprising:
   generating a batch of active bacteria solution in a biogenerator around once every 12 to 36 hours over the course of a treatment cycle, wherein the biogenerator is located near the growing pond used in the aquaculture application and wherein the active bacteria are useful for remediating the water by degrading organic waste and inhibiting the growth of pathogenic bacteria;
   adding each batch of active bacteria solution from the biogenerator to the water in the growing pond;
   providing a nitrification enhancement agent comprising an agent that increases the alkalinity of the water, an agent that provides increased surface area for the growth of biofilms, or both;
   adding the nitrification enhancement agent to the water in the growing pond contemporaneously with at least one of the batches of active bacteria; and
   wherein the active bacteria is selected from the group consisting of the genera *Bacillus, Bacteroides, Bifidobacterium, Lueconostoc, Pediococcus, Enterococcus, Lactobacillus, Megasphaera, Pseudomonas* and *Propionibacterium*.

2. The method of claim 1 wherein the active bacteria is selected from probiotic bacteria.

3. The method of claim 2 wherein the probiotic bacteria is selected from the group consisting of *Bacillus amylophilus, Bacillus licheniformis, Bacillus pumilus, Bacillus subtilis, Bacteroides ruminocola, Bacteroides ruminocola, Bacterioides suis, Bifidobacterium adolescentis, Bifidobacterium animalis, Bifidobacterium bifidum, Bifidobacterium infantis, Bifidobacterium longum, Bifidobacterium thermophilum, Enterococcus cremoris, Enterococcus diacetylactis, Enterococcus faecium, Enterococcus intermedius, Enterococcus lactis, Enterococcus thermophiles, Lactobacillus brevis, Lactobacillus buchneri, Lactobacillus bul-*

*garicus, Lactobacillus casei, Lactobacillus cellobiosus, Lactobacillus curvatus, Lactobacillus delbruekii, Lactobacillus farciminis, Lactobacillus fermentum, Lactobacillus helveticus, Lactobacillus lactis, Lactobacillus plantarum, Lactobacillus reuteri, Leuconostoc mesenteroides, Megasphaera elsdennii, Pediococcus acidilacticii, Pediococcus cerevisiae, Pediococcus pentosaceus, Propionibacterium acidipropionici, Propionibacterium freudenreichii*, and *Propionibacterium shermanii*.

4. The method of claim 1 wherein the active bacteria solution is diluted prior to adding it into the water.

5. The method of claim 4 wherein the active bacteria is diluted in water obtained from the growing pond used in the aquaculture application.

6. The method of claim 1 wherein the nitrification enhancement agent is calcium carbonate, calcified seaweed, or both.

7. The method of claim 6, wherein the nitrification enhancement agent is provided in the form of prills, pellets or particles.

8. The method of claim 6 further comprising providing and dispersing an additional surface area modifier in the water contemporaneously with at least one batch of the active bacteria.

9. The method of claim 8 wherein the surface area modifier is selected from the group consisting of particles or fragments of plastic or metal.

10. The method of claim 1 wherein the nitrification enhancement agent comprises an alkalinity increasing agent and an agent that provides increased surface area for the growth of biofilms;
wherein the alkalinity increasing agent is added to the water in the growing pond contemporaneously with a batch of active bacteria on a seasonal basis; and
wherein the alkalinity increasing agent and surface area increasing agent may be the same agent or two different agents.

11. The method of claim 1 wherein the adding bacteria and adding nitrification enhancement agents steps decrease the nitrate level in the water in the growing pond by at least around 50% compared to the level prior to these steps.

12. The method of claim 1 wherein the adding bacteria and adding nitrification enhancement agents steps decrease a level of phosphate in the water in the growing pond by at least around 50% compared to the level prior to these steps.

13. The method of claim 1 further comprising mixing or pumping the water in the growing pond to disperse the added bacteria, the nitrification enhancement agent, or both.

14. The method of 6 wherein the nitrification enhancement agent is calcified seaweed that is added to the water in the growing pond at a rate of around 100 lbs. per 1,000,000 $ft^3$ of water.

15. The method of claim 1 wherein a volume of each batch of active bacteria solution is around 3 L of solution per 100,000 gallons of water in the growing pond.

16. The method of claim 1 further comprising generating a first batch of active bacteria solution in a first biogenerator around once every 12 to 36 hours over the course of a treatment cycle;
generating one or more other batches of active bacteria solution in one or more other biogenerators around once every 12 to 36 hours over the course of the treatment cycle; and
adding each batch of active bacteria solution from the biogenerators to the water in the growing pond.

17. The method of claim 16 wherein the first batch of active bacteria solution comprises a first bacteria species and the one or more other batches of active bacteria solution comprise a second bacteria species different from the first bacteria species.

18. The method of claim 16 wherein the generating steps collectively generate batches of around 3 L of active bacteria solutions per 100,000 gallons of water being treated.

\* \* \* \* \*